United States Patent [19]

Filas

[11] 4,401,313
[45] Aug. 30, 1983

[54] COLLAPSIBLE WHEELBARROW

[76] Inventor: Leon G. Filas, 9008 Evergreen, Wonder Lake, Ill. 60097

[21] Appl. No.: 212,368

[22] Filed: Dec. 3, 1980

[51] Int. Cl.³ .............................................. B62B 1/20
[52] U.S. Cl. ................................. 280/47.31; D34/16; 280/653; 403/117
[58] Field of Search .................. 280/47.31, 47.18, 653, 280/654, 656, 659; D34/16; 248/222.4, 222.3; 411/513, 359, 364; 403/154, 155, 116, 117, 113, 112; 16/229, 230, 254

[56] References Cited

U.S. PATENT DOCUMENTS

| | | | |
|---|---|---|---|
| 944,291 | 12/1909 | Spangler | 280/47.18 |
| 1,595,163 | 8/1926 | Milazzo | 16/254 X |
| 2,800,335 | 7/1957 | Clapp | 280/47.31 X |
| 2,845,317 | 7/1958 | Orman | 403/113 X |
| 3,034,809 | 5/1962 | Greenberg | 403/117 X |
| 3,552,760 | 1/1971 | Sine | 280/47.31 X |
| 3,984,191 | 10/1976 | Doty | 403/155 X |
| 4,067,532 | 1/1978 | Viteretto | 248/222.4 X |

Primary Examiner—Robert J. Spar
Assistant Examiner—Donald W. Underwood
Attorney, Agent, or Firm—Hill, Van Santen, Steadman & Simpson

[57] ABSTRACT

A collapsible wheelbarrow having a wheel assembly, tubular members extending distally from each side of the wheel assembly, a container element affixed to the tubular members and having distinct side wall and bottom wall members, hinge elements affixed to certain side wall and bottom wall members so as to enable said side wall and bottom wall members to be folded, and/or removed, latch elements affixed to certain side wall and bottom wall members enabling said side wall and bottom wall members to be detachably affixed to one another, and rear support members.

1 Claim, 15 Drawing Figures

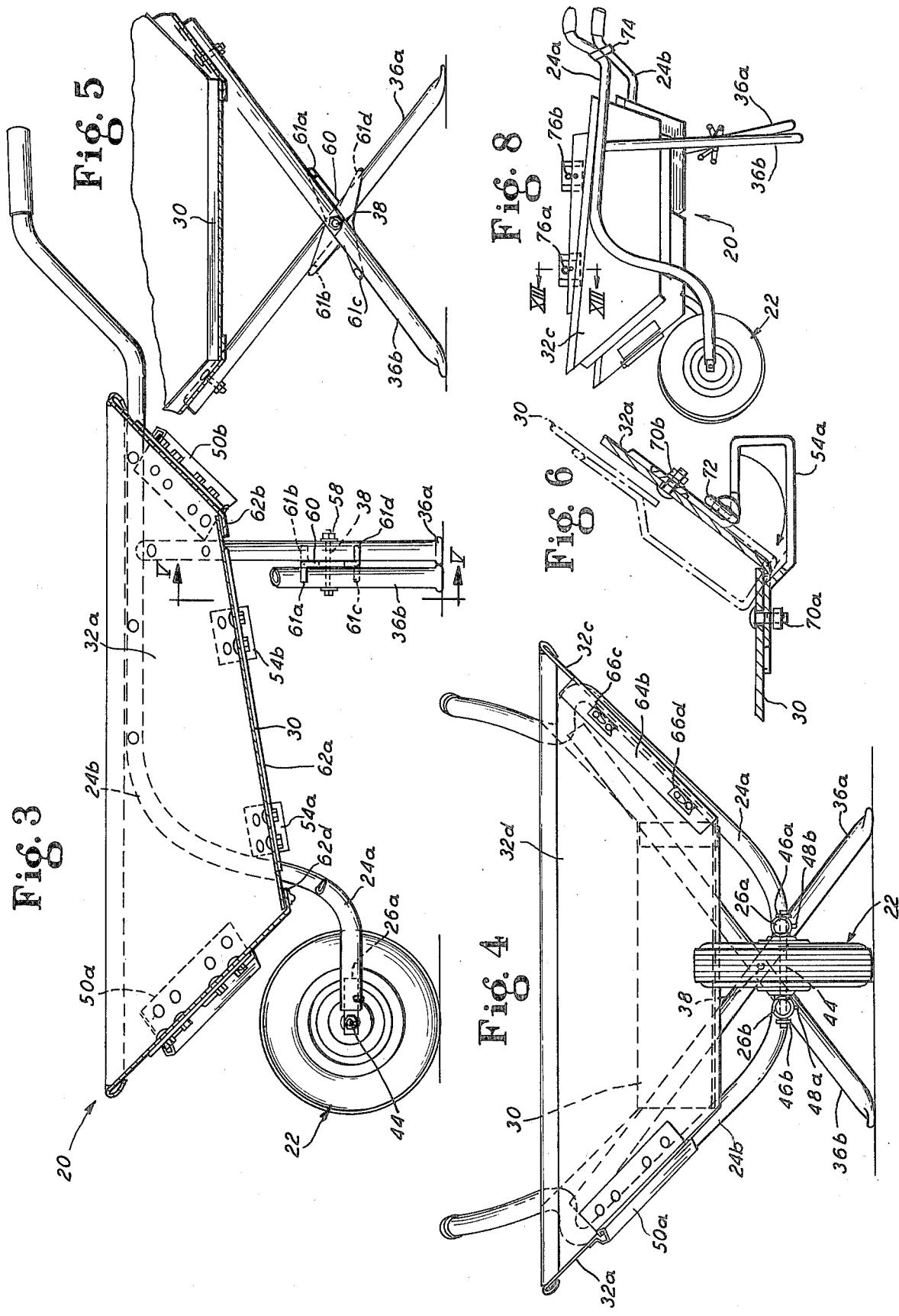

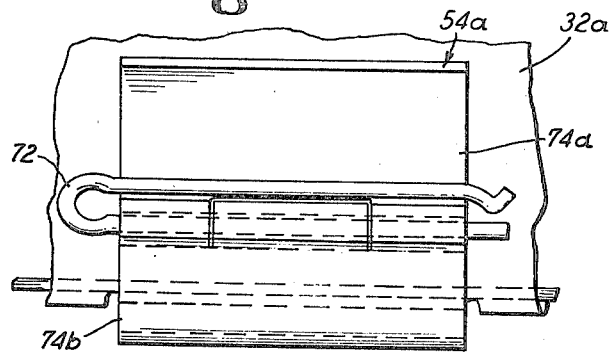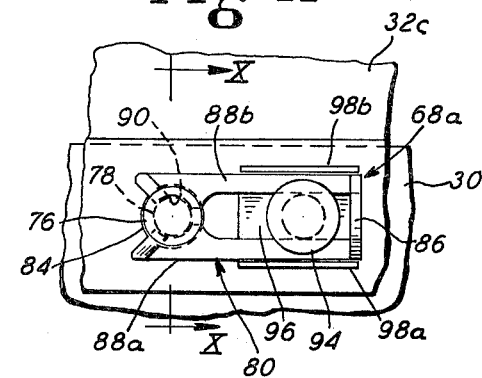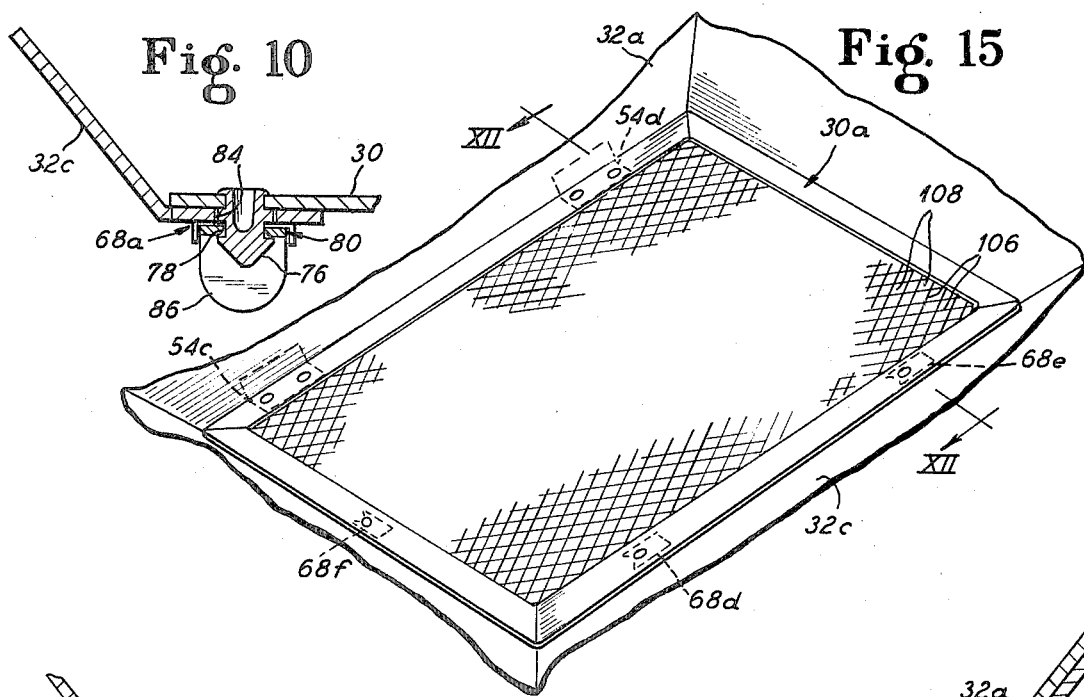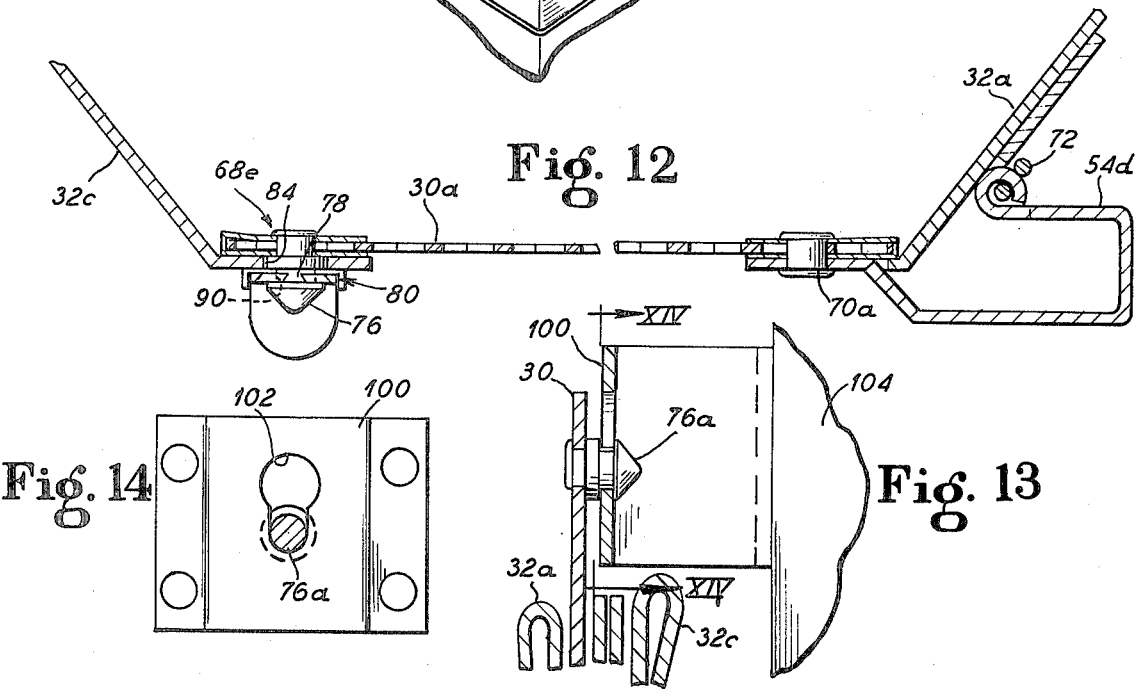

COLLAPSIBLE WHEELBARROW

BACKGROUND OF THE INVENTION

1. Field of the Invention

This invention relates to a collapsible wheelbarrow with interchangeable bottom walls which are capable of being folded to a relatively narrow width when not in use.

2. Prior Art

Heretofore, wheelbarrows, because of their generally wide body as well as extended wheel and handle portions, tended to occupy a relatively large storage area when not in use. Because of its awkward shape, it is difficult to suspend a wheelbarrow from any sort of structural support member.

SUMMARY OF THE INVENTION

In accordance with this invention there is provided a collapsible wheelbarrow capable of being easily suspended from a structural support member in a storage area.

Further, the barrow of this invention is provided with interchangeable bottom walls so as to enable a user to perform various functions with a single wheelbarrow which heretofore required individual impliments.

The invention is a collapsible wheelbarrow capable of supporting and transporting various materials when maintained in a functional position. Additionally, the wheelbarrow is capable of being folded to a relatively narrow width and suspended from a structural support member of a storage enclosure when not in use.

The wheelbarrow consists of a wheel assembly, including an axle member and stub shafts affixed to an axle member. The stub shafts are inserted into relatively long tubular members and secured thereto by means of roll pins. The roll pins permit the tubular members to swivel through a limited distance. A container element having four side walls and a bottom wall are fastened to the tubular members. Support means are fastened to the distal portion of the tubular members to provide support for the rear portion of the container element.

Three continuous side walls are affixed to one another by hinge elements so as to secure the three side walls along their interfacing edges. Additional hinge elements with easily removable cotter pins adjoin the bottom wall and one side wall along their interfacing edge.

Latch elements are placed along interfacing edges opposite the hinge elements adjoining the three continuous side walls, thus providing an easy method for disconnecting and folding the side walls for storage. Additional latch elements are placed on the underside of the bottom wall and side walls generally opposite the corresponding hinge element. In this manner, the bottom wall may be disconnected from the side walls, folded or interchanged with another bottom wall, depending on the needs of the user.

Interchangeable bottom walls, such as a meshed screen bottom wall, are available to the user. The structure of the invention is such that a single individual would be able to assemble the wheelbarrow and/or interchange bottom walls without assistance. This would enable the user to have one unit capable of transporting material and breaking up large clumps of dirt. The present invention elimates the need for separate units to perform these tasks, thus saving the user money as well as providing additional storage space.

BRIEF DESCRIPTION OF THE DRAWINGS

FIG. 3 is a cross-sectional view taken on lines III—III of FIG. 2;

FIG. 4 is a front end elevated view;

FIG. 5 is a fragmentary rear end elevational view;

FIG. 6 is a fragmentary detail view taken on lines VI—VI of FIG. 2;

FIG. 8 is a side elevational view showing the wheelbarrow in collapsed position;

FIG. 9 is an enlarged fragmentary view showing additional details of one of the hinge elements;

FIG. 10 is a cross-sectional view taken along lines X—X of FIG. 11;

FIG. 11 is a top plan view showing additional details of one of the latch elements;

FIG. 12 is a cross-sectional view taken along lines XII—XII of FIG. 15;

FIG. 13 is an enlarged side elevated view showing additional details of the mounting bracket;

FIG. 14 is a cross-sectional view taken along lines XIV—XIV of FIG. 13; and

FIG. 15 is a fragmentary top view showing an additional bottom wall.

DESCRIPTION OF THE PREFERRED EMBODIMENTS

While the principles of the present invention find a particular utility in a wheelbarrow, it will be understood that the collapsible wheelbarrow arrangement may be utilized in other combinations. By way of exemplary disclosure of the best mode of practicing the invention, and by way of enabling one of ordinary skill in the art to practice my invention, one embodiment is shown in FIGS. 1-15.

Figure 1:
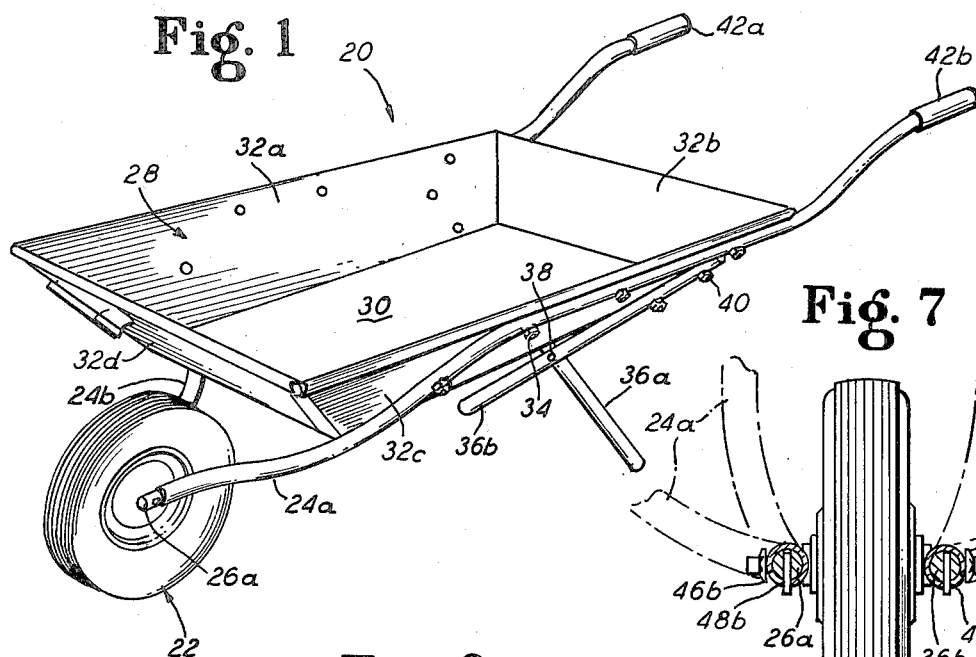
FIG. 1 is an isometric view of a wheelbarrow embodying the principles of the present invention.

FIG. 1 shows a wheelbarrow assembly 20 having a wheel assembly 22 and a pair of tubular members 24a, 24b affixed to said wheel assembly 22 by means of a stub shaft 26a, and extending distally from said wheel assembly 22. A container element 28 having a solid bottom wall 30 and side walls 32a, 32b, 32c and 32d is supportably secured to the tubular members 24a, 24b along the outer side walls 32a, 32c by means of a plurality of rivets or welds of securing bolts 34. A pair of support members 36a, 36b, formed in an X-shaped configuration, are pivotably affixed to one another by means of a support bolt 38. The support members 36a, 36b are affixed to the outer side walls 32a, 32c by means such as rivets or welds or fastening bolts 40. A corresponding handle member 42a or 42b is placed over each distal end of the tubular members 24a, 24b.

Figure 2:
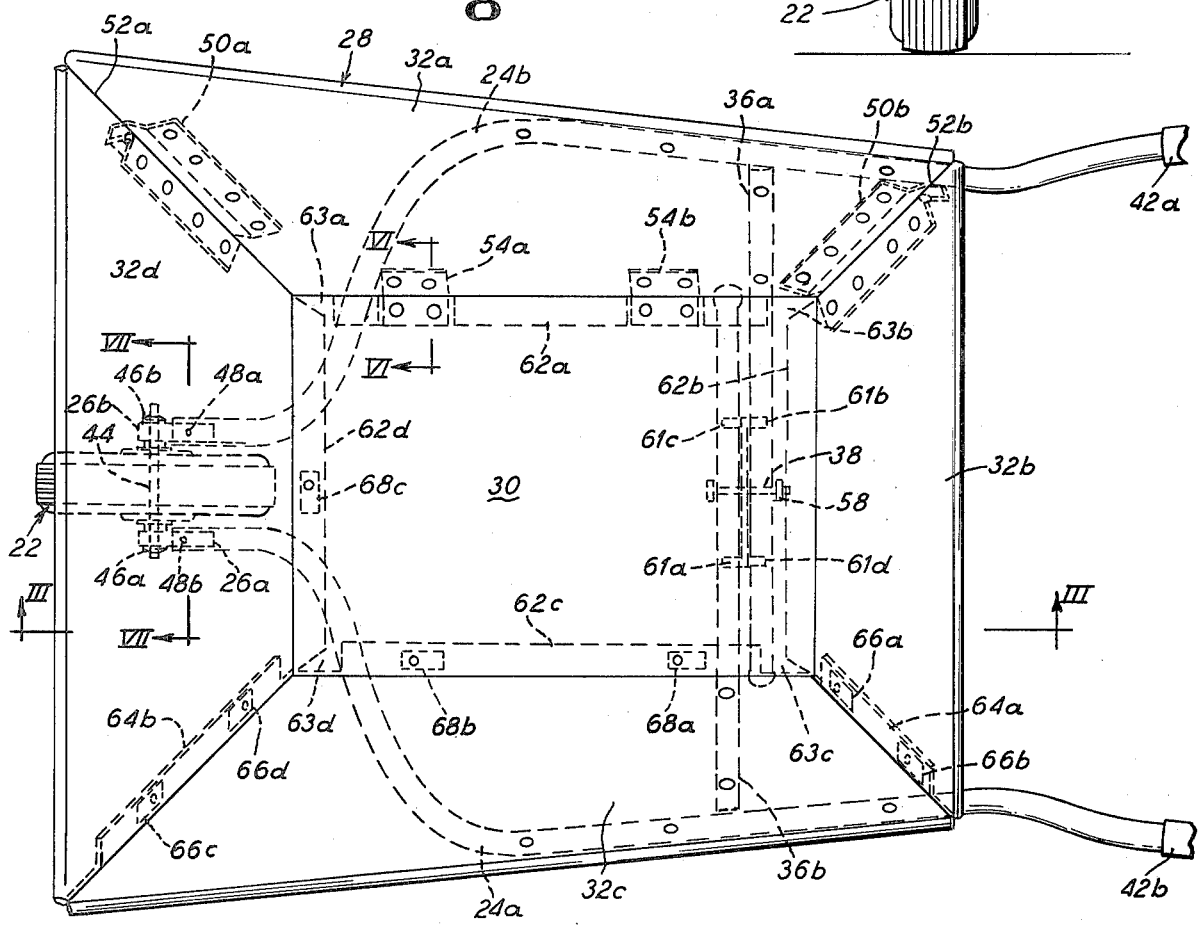
FIG. 2 is a top plan view of the wheelbarrow shown in FIG. 1.

As seen in FIG. 2, a shaft or axle member 44 is inserted through the center of the wheel assembly 22. The axle member 44 is then inserted into the stub shafts 26a, 26b. Removable securing means, for example a pair of pins 46a, 46b are then inserted through the axle member 44 so as to secure the stub shafts 26a, 26b to the wheel assembly 22. The stub shafts 26a, 26b are then inserted into the proximal ends of the tubular elements 24a, 24b and secured thereto by means of a pair of roll pins 48a, 48b which enable the tubular members 24a, 24b to swivel about a limited portion of the circumference of the stub shafts 26a, 26b.

In order to provide the collapsing capability for the wheelbarrow assembly 20, hinge elements 50a, 50b are affixed to the underside of side walls 32a, 32b, 32d so as to adjoin side walls 32a, 32b, 32d along their respective interfacing edges 52a, 52b. Additionally, supporting hinge elements 54a, 54b are affixed to the underside of bottom wall 30 and side wall 32a so as to removably adjoin the bottom wall 30 and side wall 32a.

In order to provide additional support for the container element 28, support members 36a, 36b are affixed to the outer side walls 32a, 32c. The support bolt 38 is inserted through both support elements 36a, 36b while being held in place by means of a securing nut 58. A limiting plate or element 60 having four arm members 61a, 61b, 61c, 61d is positioned between the support members 36a, 36b. Each arm member 61a, 61b, 61c, 61d extends in an outward direction so as to engage each support member 36a, 36b and limit the collapsing motion of said wheelbarrow assembly 20 while it is being placed in operational position.

The lower edges of side walls 32a, 32b, 32c, 32d are bent inwardly so as to provide support shelves 62a, 62b, 62c, 62d for said bottom wall 30. When the wheelbarrow assembly 20 is in operational position, the bottom wall 30 will rest against the support shelves 62a, 62b, 62c and 62d. Particular portions 63a, 63b, 63c, 63d of support shelves 62a, 62 c are removed so as to permit the mounting of hinge elements 54a, 54b to the bottom wall 30.

In order to prevent gaps from occurring within the container element 28, the side edges of the side wall 32c are bent inwardly at generally ninety (90) degrees forming support skirts 64a, 64b. When the wheelbarrow assembly 20 is in operational position, the side walls 32b, 32d will rest against the support skirts 64a, 64b. A plurality of latch mechanisms 66a, 66b, 66c, 66d are affixed to support skirts 64a, 64b and side walls 32b, 32d so as to permit the support skirts 64a, 64b and side walls 32b, 32d to be easily locked or unlocked as is required by the user.

In order to permit the user to interchange bottom walls for the particular use desired, latch mechanisms 68a, 68b, 68c are affixed to the bottom wall 30 and support shelves 62c, 62d. The latch mechanisms 68a, 68b, 68c permit relatively easy removal and substition of bottom wall 30.

Referring to the cross-sectional side view of the wheelbarrow assembly 20 as shown in FIG. 3 it will be noted the bottom wall 30 interfaces with support shelves 62b, 62d while the support hinges 54a, 54b are affixed to the bottom wall 30 and side wall 32a.

As shown in FIG. 4, the wheelbarrow assembly 20 in the functional position has the roll pins 48a, 48b disposed to limit the collapsing motion of wheelbarrow assembly 20 beyond the functional position as the user is attempting to alter the position of the wheelbarrow assembly 20 from collapsed to functional.

The limiting element 60 with arm members 61a, 61b, 61c, 61d provide an additional limiting means to prevent the support members 36a, 36b from pivoting beyond the functional position (FIG. 5). The limiting element 60 together with roll pins 48a, 48b prevent the wheelbarrow assembly 20 from collapsing downwardly beyond the functional position, thus enabling an individual user to alter the position of the wheelbarrow assembly 20 from collapsed to functional.

Fastening means 70a, 70b secure the hinge element 54a to the bottom wall 30 and side wall 32a. A removable cotter pin 72 is inserted in the hinge element 54a so as to enable a user to disjoin the bottom wall 30 and side wall 32 in order to interchange various bottom walls 30 as desired. The phantom lines in FIG. 6 illustrate the position of the bottom wall 30 when the wheelbarrow assembly 20 is in a collapsed position.

Figure 7:
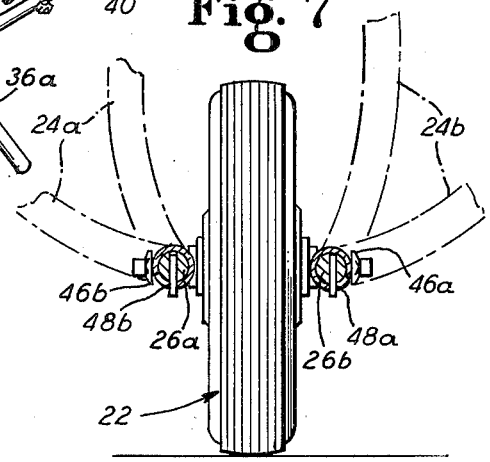
FIG. 7 is a fragmentary cross-sectional view taken on lines VII—VII of FIG. 2.

The enlarged view of the wheel assembly in FIG. 7 shows the roll pins 48a, 48b positioned behind the securing pins 46a, 46b affixed to the axle member 44. The phantom lines illustrate the limited swivel movement of the tubular members 42a, 24b by means of the roll pins 48a, 48b.

When the wheelbarrow assembly 20 is in a collapsed position of FIG. 8, the tubular members 24a, 24b, being aligned in a generally symmetrical orientation to one another, abut against one another. A snap lock member 74 is attached to each tubular member 24a, 24b so that the tubular members 24a, 24b may be separably joined to one another when the wheelbarrow assembly 20 is in a collapsed position. This serves to prevent the wheelbarrow assembly 20 from unfolding while being stored.

The hinge 54a includes interlocking bracket members 74a, 74b which are separably adjoined by means of the easily removable cotter pin 72. Such an arrangement enables the user to either fold the bottom wall 30 against side wall 32a or remove the bottom wall 30 for substitution.

The latch mechanisms 66 A-D and 68 A-B affixed to the side wall 32c and the bottom wall 30 are all similar in structure and operation and accordingly a single set of reference numerals will be used to describe on of such latch mechanisms in detail. Thus, as seen in FIG. 10, the mechanism includes a large solid cone shaped head 76 integrally connected to the bottom wall 30. Narrow adjoining neck portion 78 is formed on the head 76 to cooperate with a slidable locking means 80 carried on the side wall 32c. The side wall 32c has an aperture sized to pass the head 76.

Referring to FIG. 11 the slidable locking means 80 consists of a rear handle portion 86, bent at essentially 90°, and two resiliently flexible, essentially parallel leg members 88a, 88b which form a relatively narrow removably securing receiving recess 90 at their ends. As the neck portion 78 is forced into the somewhat smaller receiving recess 90, the leg members 88a, 88b move outwardly from one another in a camming action to form a snap lock arrangement. The legs 88a, 88b then resume their normal position once the neck portion 78 is firmly secured within the recess 90. The slidable locking means 80 is secured to the side wall 32c by means of an oversized flat head member 94 affixed to a mounting member 96 with guide means 98a, 98b. The guide means 98a, 98b act to prevent the slidable locking means 80 from moving in essentially more than one direction.

A bottom wall 30a is secured to the side wall 32c by means of a latch mechanism 68e, and to side wall 32a by means of a hinge element 54d as seen in FIG. 12. The latch mechanism 68e releasably secures the bottom wall 30a to the side wall 32c while the hinge mechanism 54a enables the user to either fold the bottom wall 30a against side wall 32a or to remove the bottom wall 30a entirely by means of the cotter pin 72.

The wheelbarrow assembly may be suspended from a fixed supporting member as shown in FIGS. 13 and 14.

A support bracket 100 with a key hole member 102 capable of securably receiving the cone shaped head element 76a of latch mechanism 68b, is affixed to any fixed element capable of supporting the wheelbarrow assembly 20, such as a wall 104. When the wheelbarrow assembly 20 is in a collapsed position, the cone shaped head 76a affixed to the bottom wall 30a is inserted into the key hole member 102. This enables the wheelbarrow assembly 20 to be maintained and stored in a collapsed position while being suspended from fixed element capable of supporting it.

FIG. 15 shows the interchangeable screen mesh bottom wall 30a consisting of screening material 106 of any size which forms interspaced openings 108 over the entire screen mesh bottom wall 30a. As a vibratory motion is applied by the user to the wheelbarrow, large clumps of dirt may be broken apart and sifted through the screening material 106. Supporting hinges 54c, 54d interconnect with corresponding brackets already fixed to side wall members 32a. Latch mechanism 68d, 68f are positioned on the screen mesh bottom wall 30a so as to be removably affixed to corresponding bracket members already affixed to support shelves 62c, 62d. Using the latch mechanisms 68d, 68e, 68f and supporting hinges 54c, 54d, the screen mesh bottom wall 30a is capable of being interchanged with the solid bottom wall 30 as well as being folded into the collapsed position.

Although various modifications might be suggested by those skilled in the art, it should be understood that I wish to embody within the scope of the patent warranted hereon all such modifications as reasonably and properly come within the scope of my contribution to the art.

I claim as my invention

1. A collapsible wheelbarrow comprising:

a wheel assembly;

symmetrically oriented tubular members connected to one end of said wheel assembly and extending distally from said wheel assembly;

swivable mounting means for mounting said tubular elements to said wheel assembly, said swivable mounting means comprising stub shafts inserted into the ends of said tubular members;

roll pins inserted through said stub shafts and said tubular members so as to limit the swivel action of said tubular members;

a container supportably mounted on said tubular members and comprising individual bottom and side wall members;

hinge elements affixed to the underside of said bottom and side wall members removably mounting said bottom wall member to said side wall members along their respective interfacing edges;

latch means including elements releasably securing said bottom wall and side wall members to one another;

support members pivotably affixed to one another and disposed to support said tubular members at an opposite end thereof; and means for limiting the pivoting movement of said support members.

* * * * *